United States Patent

[11] 3,604,619

[72] Inventor Ettore Abbiati
Ivrea (Torino), Italy

[21] Appl. No. 770,555
[22] Filed Oct. 25, 1968
[45] Patented Sept. 14, 1971
[73] Assignee Ing. C. Olivetti & C. S.p.A. (Torino), Italy
[32] Priority Oct. 30, 1967
[33] Italy
[31] 53546-A/67

[54] BIQUINARY CALCULATING MACHINE
35 Claims, 24 Drawing Figs.

[52] U.S. Cl. .......... 235/61 PA, 235/61 PB
[51] Int. Cl. .......... G06c 13/00, G06c 17/00, G06f 5/02
[50] Field of Search .......... 235/61

[56] References Cited
UNITED STATES PATENTS

| | | | |
|---|---|---|---|
| 2,798,554 | 7/1957 | Smith | 234/56 |
| 3,270,958 | 9/1966 | Hickerson | 235/61 |
| 3,465,328 | 9/1969 | Gilb | 340/324 |
| 3,504,163 | 3/1970 | Giolitti et al. | 235/60 |

*Primary Examiner*—Stephen J. Tomsky
*Attorney*—Birch, Swindler, McKie & Beckett

ABSTRACT: A biquinary calculating machine which includes a plurality of first code members, each settable selectively into two different positions to store the binary code digit of an order of a number and a corresponding plurality of second code members, each settable selectively into five different positions to store the quinary code digit of said order. The code members are arranged into a setting store and a totalization store. A tabular calculating device is provided for totalizing the numbers in the two stores and transferring the total back to the total store.

Fig. 1

| | | |
|---|---|---|
| 0 | 0 | 0 |
| 0 | 1 | 1 |
| 0 | 2 | 2 |
| 0 | 3 | 3 |
| 0 | 4 | 4 |
| 1 | 0 | 5 |
| 1 | 1 | 6 |
| 1 | 2 | 7 |
| 1 | 3 | 8 |
| 1 | 4 | 9 |

Fig. 8

| | | | | | | | | |
|---|---|---|---|---|---|---|---|---|
| 3 | 2 | 1 | 0 | 4 | | | | |
| | 2 | 1 | 0 | 4 | 3 | | | |
| | | 1 | 0 | 4 | 3 | 2 | | |
| | | | 0 | 4 | 3 | 2 | 1 | |
| | | | | 4 | 3 | 2 | 1 | 0 |

Fig. 9

| | | | | | | | | |
|---|---|---|---|---|---|---|---|---|
| 3 | 2 | 1 | 0 | 4 | 3 | 2 | 1 | 0 |

Fig. 10

| | | | | | | | | |
|---|---|---|---|---|---|---|---|---|
| 1 | 1 | 1 | 1 | 0 | | | | |
| | 1 | 1 | 1 | 0 | 0 | | | |
| | | 1 | 1 | 0 | 0 | 0 | | |
| | | | 1 | 0 | 0 | 0 | 0 | |
| | | | | 0 | 0 | 0 | 0 | 0 |

Fig. 11

| | | | | | | | | |
|---|---|---|---|---|---|---|---|---|
| 1 | 1 | 1 | 1 | 0 | 0 | 0 | 0 | 0 |

Fig. 12

| |
|---|
| 9 |
| 14 |
| 14 |
| 19 |

Fig. 14

| |
|---|
| 1 |
| 0 |
| 0 |
| 1 |

Fig. 15

| |
|---|
| 0 |
| 1 |
| 1 |
| 1 |

Fig. 13

| | | | | | | | | | |
|---|---|---|---|---|---|---|---|---|---|
| 4 | 3 | 2 | 1 | 0 | 4 | 3 | 2 | 1 | 0 |

Fig. 16

| | | | | | | | | | |
|---|---|---|---|---|---|---|---|---|---|
| 1 | 1 | 1 | 1 | 1 | 0 | 0 | 0 | 0 | 0 |

Fig. 2

| | | | | | | | | | | | | | | | | | | | | | | | | | |
|---|---|---|---|---|---|---|---|---|---|---|---|---|---|---|---|---|---|---|---|---|---|---|---|---|---|
| 8 | 7 | 6 | 5 | 4 | 7 | 6 | 5 | 4 | 3 | 6 | 5 | 4 | 3 | 2 | 5 | 4 | 3 | 2 | 1 | 4 | 3 | 2 | 1 | 0 | 00 |
| 13 | 12 | 11 | 10 | 9 | 12 | 11 | 10 | 9 | 8 | 11 | 10 | 9 | 8 | 7 | 10 | 9 | 8 | 7 | 6 | 9 | 8 | 7 | 6 | 5 | 01 |
| 13 | 12 | 11 | 10 | 9 | 12 | 11 | 10 | 9 | 8 | 11 | 10 | 9 | 8 | 7 | 10 | 9 | 8 | 7 | 6 | 9 | 8 | 7 | 6 | 5 | 10 |
| 18 | 17 | 16 | 15 | 14 | 17 | 16 | 15 | 14 | 13 | 16 | 15 | 14 | 13 | 12 | 15 | 14 | 13 | 12 | 11 | 14 | 13 | 12 | 11 | 10 | 11 |

Fig. 3

| | | | | | | | | | | | | | | | | | | | | | | | | | |
|---|---|---|---|---|---|---|---|---|---|---|---|---|---|---|---|---|---|---|---|---|---|---|---|---|---|
| 8 | 7 | 6 | 5 | 4 | 7 | 6 | 5 | 4 | 3 | 6 | 5 | 4 | 3 | 2 | 5 | 4 | 3 | 2 | 1 | 4 | 3 | 2 | 1 | 0 | 00 |
| 3 | 2 | 1 | 0 | 9 | 2 | 1 | 0 | 9 | 8 | 1 | 0 | 9 | 8 | 7 | 0 | 9 | 8 | 7 | 6 | 9 | 8 | 7 | 6 | 5 | 01 |
| 3 | 2 | 1 | 0 | 9 | 2 | 1 | 0 | 9 | 8 | 1 | 0 | 9 | 8 | 7 | 0 | 9 | 8 | 7 | 6 | 9 | 8 | 7 | 6 | 5 | 10 |
| 8 | 7 | 6 | 5 | 4 | 7 | 6 | 5 | 4 | 3 | 6 | 5 | 4 | 3 | 2 | 5 | 4 | 3 | 2 | 1 | 4 | 3 | 2 | 1 | 0 | 11 |

Fig. 4

| | | | | | | | | | | | | | | | | | | | | | | | | |
|---|---|---|---|---|---|---|---|---|---|---|---|---|---|---|---|---|---|---|---|---|---|---|---|---|
| 3 | 2 | 1 | 0 | 4 | 2 | 1 | 0 | 4 | 3 | 1 | 0 | 4 | 3 | 2 | 0 | 4 | 3 | 2 | 1 | 4 | 3 | 2 | 1 | 0 |

Fig. 5

| | | | | | | | | | | | | | | | | | | | | | | | | | |
|---|---|---|---|---|---|---|---|---|---|---|---|---|---|---|---|---|---|---|---|---|---|---|---|---|---|
| 1 | 1 | 1 | 1 | 0 | 1 | 1 | 1 | 0 | 0 | 1 | 1 | 0 | 0 | 0 | 1 | 0 | 0 | 0 | 0 | 0 | 0 | 0 | 0 | 0 | 00 |
| 0 | 0 | 0 | 0 | 1 | 0 | 0 | 0 | 1 | 1 | 0 | 0 | 1 | 1 | 1 | 0 | 1 | 1 | 1 | 1 | 1 | 1 | 1 | 1 | 1 | 01 |
| 0 | 0 | 0 | 0 | 1 | 0 | 0 | 0 | 1 | 1 | 0 | 0 | 1 | 1 | 1 | 0 | 1 | 1 | 1 | 1 | 1 | 1 | 1 | 1 | 1 | 10 |
| 1 | 1 | 1 | 1 | 0 | 1 | 1 | 1 | 0 | 0 | 1 | 0 | 0 | 0 | 0 | 1 | 0 | 0 | 0 | 0 | 0 | 0 | 0 | 0 | 0 | 11 |

Fig. 6

| | | | | | | | | | | | | | | | | | | | | | | | | |
|---|---|---|---|---|---|---|---|---|---|---|---|---|---|---|---|---|---|---|---|---|---|---|---|---|
| 1 | 1 | 1 | 1 | 0 | 1 | 1 | 1 | 0 | 0 | 1 | 1 | 0 | 0 | 0 | 1 | 0 | 0 | 0 | 0 | 0 | 0 | 0 | 0 | 0 |
| 0 | 0 | 0 | 0 | 1 | 0 | 0 | 0 | 1 | 1 | 0 | 0 | 1 | 1 | 1 | 0 | 1 | 1 | 1 | 1 | 1 | 1 | 1 | 1 | 1 |

Fig. 7

| | | | | | | | | | | | | | | | | | | | | | | | | | |
|---|---|---|---|---|---|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 00 |
| 1 | 1 | 1 | 1 | 0 | 1 | 1 | 1 | 0 | 0 | 1 | 1 | 0 | 0 | 0 | 1 | 0 | 0 | 0 | 0 | 0 | 0 | 0 | 0 | 0 | 01 |
| 1 | 1 | 1 | 1 | 0 | 1 | 1 | 1 | 0 | 0 | 1 | 1 | 0 | 0 | 0 | 1 | 0 | 0 | 0 | 0 | 0 | 0 | 0 | 0 | 0 | 10 |
| 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 11 |

BIQUINARY CALCULATING MACHINE

CROSS-REFERENCE TO RELATED APPLICATION

Applicant claims priority from corresponding Italian Pat. application Ser. No. 53,546–A/67, filed Oct. 30, 1967.

BACKGROUND OF THE INVENTION

1. Field of the Invention

The present invention relates to a machine for calculating with decimal numbers in which each decimal order to two operands is stored in accordance with a biquinary code and also concerns a store for use in such machine. 2. Description of the Prior Art A machine for calculating with decimal numbers is known in which each decimal order is represented in accordance with a pure binary code by electronic devices. In a known machine of this type the calculating unit for each decimal order of the operands is constituted by a series of bars divided into 10 sectors corresponding to the 10 possible values of the decimal digit constituting one operand, each of the sectors being divided in turn into 10 parts corresponding to the 10 possible values of the digit constituting the other operand, each of the hundred parts being in conformity with one of the hundred possible sums of 10 decimal numbers in twos and being adapted to be selected through the two operands. This apparatus is very complex and bulky and is difficult to extend to the calculation of multiorder amounts.

An apparatus is also known for calculating decimal numbers coded in accordance with a biquinary code, also stored in electronic devices. The calculating unit for the addition is constituted by electromagnets, which are selectively energized in correspondence to the value of the two addends. The energized electromagnets close a circuit for the quinary digit, a circuit for the binary digit and one of two circuits for the carry, a first one if the carry is zero, a second one if the carry is one. This apparatus is rather complicated and moreover it is expensive and unreliable.

SUMMARY OF THE INVENTION

According to the invention, there is provided a store for decimal numbers in which each decimal order is represented in accordance with a biquinary code, wherein the binary and quinary digits of an order are stored on first and second code mechanical members which are respectively settable in five different and two different positions.

Also according to the invention there is provided a machine for calculating with decimal numbers coded in accordance with a biquinary code, comprising a setting store and a total store, each store order comprising a five-position first mechanical member and a two-position second mechanical member, and a calculating unit including a tabular member having first and second stepped profiles with five and two step levels respectively for representing the quinary and binary digit respectively of the sum of quinary digits stored on the two first members, a sensing arrangement with separate sensing means on a common support for sensing the first and second profiles respectively, means for shifting the tabular member under the control of a first member of one store and means for shifting the sensing arrangement under the control of a first member of the other store, whereby the total relative displacement of the tabular member and sensing arrangement represents the sum of the two quinary digits stored by the two first members.

According to another aspect of the invention these is provided a machine for calculating with decimal numbers, comprising a setting store and a total store adapted to store two operands respectively and each adapted to store each decimal order of its operand in accordance with a biquinary code on first and second code mechanical members which are respectively settable in five different and two different positions, the setting store being adapted to receive in succession the numbers entered in the machine, and a calculating unit being arranged to read the two stores order by order and to apply the two digits pertaining to each order to tabular calculating means which respond to the joint positions of the two first code members and the two second code members pertaining to those digits to deliver the results of the operation, order by order, to the total store while temporarily storing the carry digit for the following order.

BRIEF DESCRIPTION OF THE DRAWINGS

The invention will be described in more detail, by way of example, with reference to the accompanying drawings, in which:

FIG. 1 is a table illustrating the correspondence between the decimal numbers and the numbers coded in accordance with the biquinary code:

FIG. 2 is a series of tables in which are given the hundred possible sums of the decimal numbers in twos;

FIG. 3 is a series of tables derived from FIG. 2 and giving for each number only the the digits of the units order;

FIG. 4 is a series of tables derived from FIG. 3 and giving for each column thereof, the corresponding decimal units from zero to four in accordance with the biquinary code;

FIG. 5 is a series of tables giving the binary digits of the corresponding numbers of the tables of FIG. 3;

FIG. 6 is a reduction of the tables of FIG. 5;

FIG. 7 is a series of tables in which are given the digits of the tens order of the corresponding numbers of the tables of FIG. 2;

FIG. 8 is a table in which the tables of FIG. 4 are shown staggered so that like numbers are arranged in columns;

FIG. 9 is a reduction of the table of FIG. 8, showing the decimal units from zero to four of the sum numbers irrespective of the addends which have generated this number;

FIG. 10 is a table in which the first lines of the tables of FIG. 5 are shown staggered in the same way as the table of FIG. 8;

FIG. 11 is a reduction of the table of FIG. 10;

FIG. 12 is a table obtained by adding one unit to the first column on the left of the first table of FIG. 2;

FIG. 13 is a table similar to the table of FIG. 9 and into which the possibility of taking account of the carries has been introduced:

FIG. 14 is a table showing the binary digits of the corresponding numbers of the units order of the table of FIG. 12;

FIG. 15 is a table in which are shown the digits of the tens order of the table of FIG. 12;

FIG. 16 is a table similar to the table of FIG. 11, with the addition of one unit which takes account of the binary digit of the column added for carries;

DESCRIPTION OF THE PREFERRED EMBODIMENT

Introduction

Figures 17, 21:
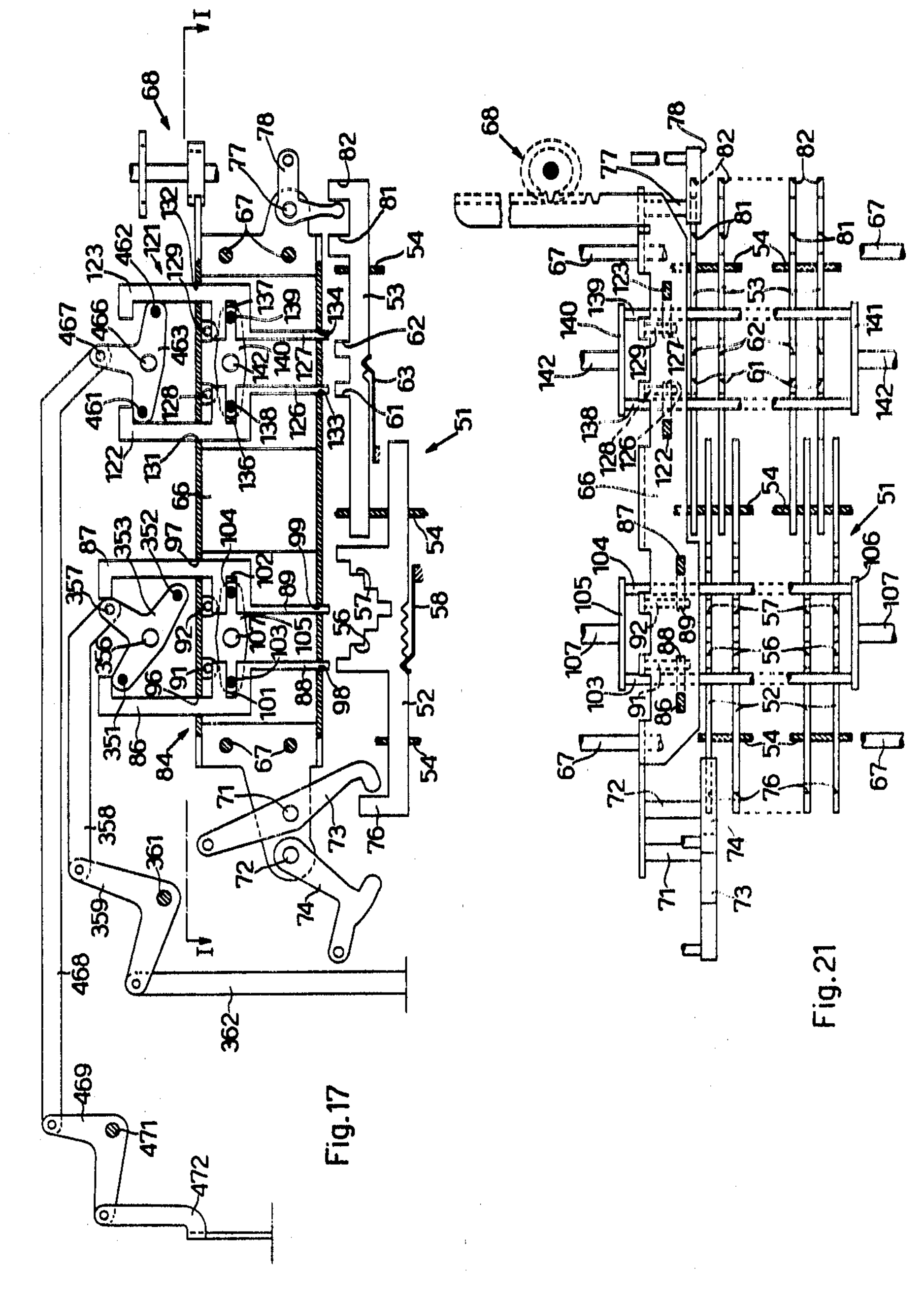
FIG. 17 is a left-hand side view of one store of a calculating machine embodying the invention.
FIG. 21 is a section on the line 1—I of FIG. 17.

Representing the 10 digits in accordance with a biquinary code, the weight of the digits of this code is one for the quinary digit and five for the binary digit. The correspondence with the decimal digits is as indicated in FIG. 1, which gives the first column the representation of the decimal digits in accordance with the code indicated and in the second column the corresponding decimal digits.

There are 100 numbers which are the sum of the 10 decimal numbers in twos and of these 45 are constituted by numbers having two digits, which signifies the need to take account of a carry. These sum numbers can be grouped in five tables (FIG. 2). To this end, the numbers of the first addend are divided into five groups, namely 4 and 9; 3 and 8; 2 and 7; 1 and 6 0 and 5. In each group the second number is obtained from the first by transforming the binary digit from zero to one, that is to say by adding five to the first number. The numbers of the second addend are divided into two groups: 4, 3, 2, 1, 0 and 9, 8, 7, 6, 5, in which the numbers of the second group are obtained by adding the number five to all the numbers of the first group in succession, that is, in accordance with the biquinary code, by transforming the binary digit from zero to one.

The first line of the first table on the left of FIG. 2 is formed by the numbers obtained by addition of the first number of the first group of the first addend, that is 4, to all the numbers of the first group of the second addend, that is 4, 3, 2, 1, 0; the second line is formed by the numbers which are again the sum of the number 4 and the numbers of the second group of the second addend, that is 9, 8, 7, 6, 5; the third line is formed by the numbers which are the sum of the second number of the first group of the first addend, that is, 9, and the numbers of the first group of the second addend, that is 4, 3, 2, 1, 0; the fourth line is formed by the numbers which are the sum of the number 9 and the numbers of the second group of the second addend, that is 9, 8, 7, 6, 5. The second, third, fourth and fifth tables of FIG. 1 are obtained in the same way by using respectively the second, the third, the fourth and the fifth group of numbers of the first addend, that is 3 and 8, 2 and 7, 1 and 6, 0 and 5. Each number in the first line of these tables is the sum of two numbers having the binary digit equal to zero; in the second line, the first addend has the binary digit equal to zero and the second has the binary digit equal to one; in the third line, the first addend has the binary digit equal to one and the second addend has the binary digit equal to zero; in the fourth line, both the first and the second addend have the binary digit equal to one.

This information is summarized in the last table of FIG. 1, in which a zero indicates the fact that a number has the binary digit equal to zero and a one indicates the fact that a number has the binary digit equal to one and in which the first numeral relates to the first addend and the second to the second addend. These pairs of numerals are taken as being distinctive of the lines of the entire Figure.

Considering for the present only the units digit of each sum number and disregarding the carries, there are obtained in this way the five tables of FIG. 3. We observe that the first line is the same as the fourth and the second line is the same as the third and, moreover, that the numbers in each column are either alike or differ from each other only as regards the binary digit.

For the purposes of quinary digit only, the numbers in each column are alike and we can therefore summarize the tables of FIG. 3 in the five tables of FIG. 4, which consist of a single line. The five tables of FIG. 4 therefore give us the quinary digits appertaining to the decimal numbers of the units order of the sum numbers.

Referring to the tables of FIG. 3, it is possible to construct another series of five tables (FIG. 5) in which a zero indicates the fact that the corresponding number of FIG. 3 has the binary digit equal to zero and a one indicates the fact that the corresponding number has the binary digit equal to one. The first and last lines of FIG. 5, that is the lines 00 and 11, are identical and the lines 01 and 10 are also identical, so that the tables of FIG. 5 can be reduced to only two lines (FIG. 6), which are moreover formed of numerals which are complementary to one another.

Finally, it is possible to construct another series of five tables (FIG. 7) in which there is respectively indicated by a zero or a one the fact that in the corresponding sum number of tables of FIG. 2 there is not or there is a carry. The line 00 of these tables is composed entirely of zeros and therefore the carry is never present; the line 11 is composed entirely of ones, so that there is always a carry; the lines 01 and 10 have zeros and ones, are alike and are moreover the same as the first line of the tables of FIG. 6.

Returning to the tables of FIG. 4, it can be observed that each table is composed of the same numbers in cyclic rotation. Since, for the purposes of calculation, it is of no interest which are the addends which assist in forming a certain sum number, like numbers can be put together.

The number 3 of the first table of FIG. 4, however, is characterized by a position of the binary digit (FIGS. 5 and 6) which is different to that corresponding to the number 3 of the second table, for which reason these two numbers must be kept separate.

By constructing another table (FIG. 8) in which the five tables of FIG. 4 are shown staggered in succession by one step, the result is obtained that the columns of FIG. 8 are formed of like numbers having the same situation or position of the binary digit (FIGS. 5 and 6). This table can therefore be summarized in a further table (FIG. 9) formed by a single line in which, for the purposes of the quinary digit only and without taking account of the carries, all the sum numbers of FIG. 2 are summarized irrespective of which addends have generated this number.

In the construction of the table of FIG. 8, the five tables of FIG. 4 are shifted in succession one with respect to the other by one step to the right, in a manner corresponding to a reduction of one unit in the digits of the first addend which have taken part successively in the formation of the sums of the five tables of FIG. 4.

A table can be constructed (FIG. 10), in association with the table of FIG. 8 and formed in the same way, in which is shown the first line of the tables of FIG. 6 or, which comes to the same thing, the line 01 or 10 of FIG. 7. Each column of this table is formed entirely of zeros or entirely of ones and, moreover, all the numerals in each column are associated with the same sum quinary digit. This table can therefore be summarized in a table (FIG. 11) formed by a single line and in which each numeral represents the situation or position of the corresponding number in the table of FIG. 9 as regards the binary digit and the carry. More precisely, the numeral expresses the position as regards the binary digit in the cases 00 and 11 and as regards the carry in the cases 01 and 10. As regards the binary digit, in the cases 01 and 10 there is a complementary position, while, as regards the carries, a carry is always absent in the case 00 and a carry is always present in the case 11. The presence of a carry entails the addition of one unit to the number which is the sum of the digits of the order immediately following. It is possible to achieve this by shifting the reader of the table of FIG. 9 by one step to the left with respect to the table or, which comes to the same thing, by shifting the table of FIG. 9 by one step to the right with respect to the reader, when this reads the digit of the following order.

In order to permit the addition of the carry unit also the last digit on the left of the table of FIG. 9, that is to the 3, there can be added to this table another digit, which is four obtained as a reduction of table (FIG. 12) obtained in turn by adding one unit to the last column on the left of FIG. 2. The table of FIG. 9 is thus transformed into the table of FIG. 13. The four added in this way has a situation or position of the binary digit which is represented in FIG. 14 and a position of the carries which is represented in FIG. 15. FIG. 11, which relates to the binary digit and to the carries, is also completed in this way and the table of FIG. 16 is obtained.

In order to effect the addition, it can be imagined that the two tables of FIG. 13 and FIG. 16 are fixed to shift together and that there are two readers adapted to read these tables and disposed in correspondence with the last box on the right of the tables. The two readers can move to the left and are controlled in their movement by the sum of the quinary digit of one addend and the possible carry. On the other hand, the two tables can shift to the right and are controlled by the quinary digit of the other addend. The relative movement between the readers and the tables is thus equal to the sum of the two quinary digits and the possible carry.

The reading of the table of FIG. 13 therefore supplies the value of the quinary digit of the result of the addition, while the reading of the table of FIG. 16 supplies the true value of the binary digit of the result only in the cases 00 and 11. On the other hand, in the cases 01 and 10, the value of the binary digit read is complementary to the true value, so that it is necessary to form the complement of the value read.

The reading of the table of FIG. 16 also supplies true information of the presence or absence of a carry in the cases 01 and 10, while in the case 00 a carry is always absent and in the case 11 a carry is always present.

SETTING STORE

The calculating machine includes a setting store 51 (FIGS. 17 and 21) having a plurality of decimal orders and which comprises in each order a first mechanical member adapted to be set selectively in one of two positions corresponding to the two values of the binary digit and a second mechanical member adapted to be set selectively, substantially simultaneously with the first mechanical member, in one of five different positions corresponding to the five values of the quinary digit.

More particularly, the first and second members are constituted by two sliders 52 and 53 guided in fixed combs 54. Each slider 52 is provided with a symmetrical pair of stepped profiles 56 and 57 each consisting of five steps, the lowest of which is common to the two profiles. The two profiles 56 and 57 are respectively adapted to represent the decimal values from zero to four and their complements. Each slider 52 is held in five different positions by a spring-positioning element 58 and is thus adapted to a store a quinary digit. Each slider 53 is provided with a pair of shoulders 61 and 62 and cooperates with a spring-positioning element 63 adapted to hold it in two different positions. Each shoulder 61 and 62 defines two levels, one of which coincide with the edge of the slider 53. The shoulders 61 and 62 are symmetrical and are adapted to represent positively the values of a binary digit and the complements of these values. Each slider 53 is thus adapted to store a binary digit.

Associated with the setting store 51 is a carriage 66 slidable transversely on four fixed rods 67 and controlled in this transverse movement to the left by a step-by-step advancing device 68 of any known type. The carriage 66 is equipped with two pins 71 and 72 on which there are pivoted setting levers 73 and 74, respectively. These levers are operated in any known manner and are adapted to be shifted selectively for two complementary strokes in opposite directions so as to act positively on a projection 76 of each slider 52 in turn, positioning the sliders in one of the five different positions and thus entering the quinary digits in the setting store. The carriage 66 carries another pin 77 on which these is pivoted a setting lever 78 which is also operated in any known manner. The lever 78 is adapted to perform a constant stroke selectively either forward or to the rear so as to cooperate with two teeth 81 and 82 of each slider 53 positioned the sliders in one or the other position of storage of the binary digit, the teeth 81 and 82 being spaced by the length of the said stroke. In this way, the binary digits are entered in the setting store. When the setting levers 73, 74, 78 are inoperative, they are located in correspondence with the pair of sliders 52 and 53 which are disposed at the right-hand end of the setting store 51.

In correspondence with the profiles 56 and 57 of the sliders 52, the carriage 66 carries a sensing device 84 constituted by a pair of bars 86 and 87 provided with reading projections 88 and 89 respectively, disposed at a distance such as to read two complementary values of the quinary digit on the two profiles 56 and 57. The bars 86 and 87 normally bear against studs 91 and 92 respectively and are guided in their downward movement in slots 96 and 97 respectively, formed in the upper crosspiece of the carriage 66, and, by means of the projections 88 and 89, in slots 98 and 99 respectively, formed in the lower crosspiece of the carriage. The bars 86 and 87 have forks 101 and 102 respectively in which rods 103 and 104 respectively are engaged. The rods 103 and 104 extend across the entire series of sliders 52 and are carried by a pair of rocking levers 105 and 106 pivoted on a spindle 107. The spindle 107 is adapted to be carried downward cyclically in any known manner.

The carriage 66 carries a second sensing device 121 constituted by a pair of bars 122, 123 provided with reading projections 126 and 127 respectively, disposed at a distance such as to read two complementary values of the binary digit on the two shoulders 61 and 62 of the sliders 53. The bars 122 and 123 are normally held so that they bear against studs 128 and 129 respectively, fixed to the carriage 66 and are guided in their downward movement in slots 131 and 132 respectively formed in the upper crosspiece of the carriage 66, and, by means of the projections 126 and 127, in slots 133 and 134 respectively formed in the lower crosspiece of the carriage. The bars 122 and 123 have forks 136 and 137 respectively in which the rods 138 and 139 are engaged. The rods 138 and 139 extend across the entire series of sliders 53 and are carried by a pair of rocking levers 140 and 141 pivoted on a spindle 142. The spindle is likewise adapted to be carried downward cyclically in any known manner. When the sensing devices 84 and 121 are inoperative, they are disposed one step to the right with respect to the first pair of sliders 52, 53 to be set and therefore with respect to the levers 73, 74 and 78.

Although the mechanism for setting the levers 73, 74 and 78 is not shown it will be understood that each key of a 10-key keyboard can be coupled to the levers in such a manner that the three levers are simultaneously moved to the position corresponding, in accordance with the biquinary code, with the digit value of whichever key is depressed.

TOTAL STORE

Figure 22:
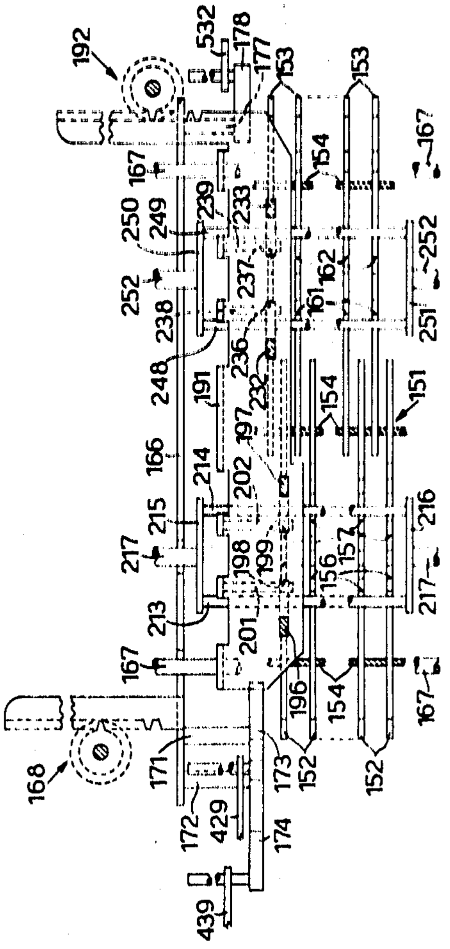
FIG. 22 is a section on the line II—II of FIG. 18.

The calculating machine also includes a total store 151 (FIGS. 18 and 22) similar to the setting store 51 and constituted by a series of pairs of sliders 152 and 153 corresponding to the sliders 52 and 53 respectively. The number of these sliders is equal to the total-capacity digits and they are guided in two fixed combs 154. Each slider 152 is provided with a symmetrical pair of stepped profiles 156 and 157 each consisting of five steps, the lowest of which is common to the two profiles. Each slider 152 is held in five different positions by a spring-positioning element 158 and is thus adapted to store a quinary digit. Each slider 153 is provided with a pair of shoulders 161 and 162 having two positions and cooperates with a spring-positioning element 163 adapted to hold it in two different positions so as to be able to store the binary digit.

Associated with the total store 151 is a carriage 166 slidable transversely on four fixed rods 167 and controlled in this movement by a step-by-step advancing device 168 of any known type. The carriage 166 is equipped with two pins 171 and 172 on which there are pivoted setting levers 173 and 174 respectively, operated in a manner which will be described hereinafter. These levers are adapted to be shifted selectively for two complementary strokes and are adapted to act on a projection 176 of each of the sliders 152 to position them positively and selectively in one of the five different positions adapted to store the quinary digits. The carriage 166 carries another pin 177 on which there is pivoted a setting lever 178 which is also operated in a manner which will be described hereinafter. The lever 178 is adapted to cooperate with two projections 181 and 182 of each of the sliders 153 to position said sliders in one or the other position of storage of the binary digit. When the setting levers 173, 174, 178 are inoperative, they are disposed so that they are offset by one step to the right with respect to the first pair of sliders 152, 153 to be set and are therefore disengaged from the store.

Associated with the total store 151 is a second carriage 191 slidable transversely on the four rods 167 and controlled in this movement by a step-by-step advancing device 192 of any known type. The carriage 191 is disposed so that it is shifted by one step to the left with respect to the carriage 166. In correspondence with the profiles 156 and 157 of the sliders 152, the carriage 191 carries a sensing device 194 similar to the sensing device 84 and constituted by a pair of bars 196 and 197 provided with reading projections 198 and 199, respectively, adapted to sense the profiles 156 and 157 respectively of the sliders 152. The bars 196 and 197 are normally held so that they bear against studs 201 and 202 carried by the carriage 191 and are guided in their downward movement in slots 206 and 207 formed in the upper crosspiece of the carriage 191, and, by means of the projections 198 and 199, in slots 208 and 209 formed in the lower crosspiece of the carriage. The bars 196 and 197 have forks 211 and 212 in which rods 213 and 214 are engaged. These rods extend across the entire series of sliders 152 and are carried by a pair of rocking levers 215 and 216 pivoted on a spindle 217. This spindle is adapted to be carried downward cyclically in any known manner.

The carriage 191 carries a second sensing device 231 similar to the sensing device 121 and constituted by a pair of bars 232, 233 provided with projections 236 and 237 adapted to sense the shoulders 161 and 162 respectively of the sliders 153. The bars 232 and 233 are normally held so that they bear against studs 238 and 239 fixed to the carriage 191 and are guided in their downward movement in slots 241 and 242 formed in the upper crosspiece of the carriage 191, and, by means of the projections 236 and 237, in slots 243 and 244 formed in the lower crosspiece of the carriage. The bars 232 and 233 have forks 246 and 247 in which rods 248 and 249 are engaged. The rods 248 and 249 extend across the entire series of sliders 153 and are carried by a pair of rocking levers 250 and 251 pivoted on a spindle 252. This spindle is adapted to be carried downward cyclically in any known manner. When the sensing devices 194 and 231 are inoperative, they are disposed in correspondence with the first pair of sliders 152 on the right and offset respectively by one step to the left with respect to the setting levers 173, 174 and 178.

CALCULATING UNIT

The machine also comprises a calculating unit 281 constituted by a tabular member having a stepped profile representing the quinary digit of the sum and a pair of shoulder representing the binary digit of the sum. This tabular member is adapted to assume in a first direction a position variable according to the value of the digit set in the setting store and cooperates with a sensing arrangement comprising two separate sensing devices carried by a common support adapted to assume in a second direction a position variable according to the value of the quinary digit set in the total store. The tabular member is constituted by a slider 282 guided in two fixed combs 283. The tabular member or slider is provided with a stepped profile 286 adapted to represent the values of the quinary digit which are shown in the table of FIG. 13 and with a stepped profile 288 symmetrical with respect to the profile 286 and therefore adapted to represent the complementary values of the digits of the table of FIG. 13. The slider 282 is moreover provided with two shoulders 291 and 292 which are positioned in complementary manners with respect to corresponding sensing means. Each of these shoulders has two levels, one which coincides with the edge of the slider. The shoulder 291 is adapted to represent the values of the binary digit which are shown in the table of FIG. 16 and the shoulder 292 is adapted to represent the values which are complementary thereto. The slider 282 cooperates with a spring-positioning element 293 adapted to hold the slider in five different positions. The calculating unit moreover comprises a pair of sensing devices 296, 297 carried by a slide 298 slidable in combs 283 and held in six different positions by a spring-positioning element 299.

The sensing device 296 is constituted by two bars 301 and 302 provided with reading projections 303 and 304 respectively and guided in slots 306 and 307 formed in the upper crosspiece of the slide 298, and, by means of the projections 303 and 304, in slots 308 and 309 formed in the lower crosspiece of the slide 298. The bars 301 and 302 normally bear against studs 311 and 312 fixed to the slide 298 and are disposed in such manner as to sense the complementary values represented on the stepped profiles 286 and 288 respectively. The bars 301 and 302 are provided with slots 313 and 314 engaged by pins 316 and 317 fixed to a rocking lever 318 fulcrumed on a pivot 319. This pivot is adapted to be carried downward cyclically in any known manner.

Similarly, the sensing device 297 is constituted by two bars 331 and 332 provided with reading projections 333 and 334 respectively, and respectively guided in slots 336 and 337 formed in the upper crosspiece of the slide 298 and, by means of the projections 333, 334, in slots 338 and 339 formed in the lower crosspiece of the slide 298. The bars 331 and 332 normally bear against studs 341 and 342 fixed to the slide 298 and are respectively adapted to sense the complementary values represented on the shoulders 291 and 292 of the slider 282. The bars 331 and 332 are provided with slots 343 and 344 engaged by pins 346 and 347 fixed to a rocking lever 348. The rocking lever 348 is fulcrumed on a pivot 349 adapted to be carried downward cyclically in any known manner.

Figure 19:
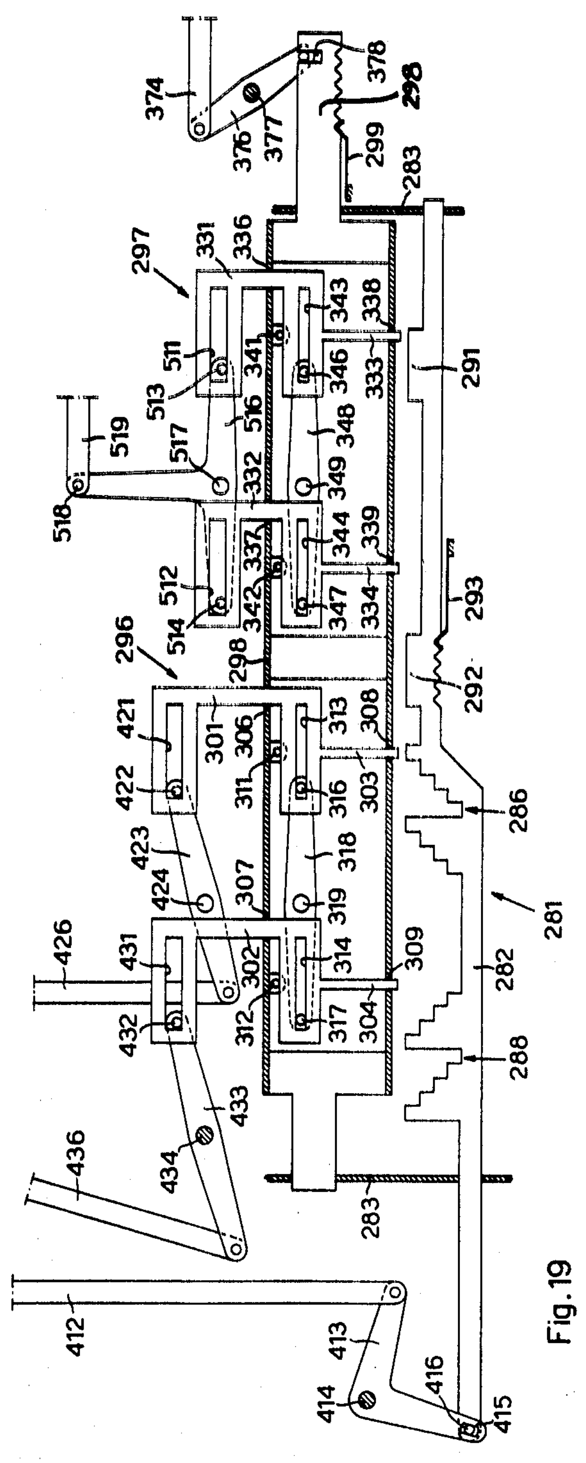
FIG. 19 is a left-hand side view of a detail of the tabular means of the machine.

The bars 86 and 87 (FIG. 17) of the sensing device 84 cooperate with rods 351 and 352 respectively, carried by a pair of rocking levers 353 (only one being visible in the drawing) disposed at the two sides of the store 51. These rocking levers can picot on a fixed spindle 356 and carry a third rod 357 to which there is pivoted a link rod 358. This rod is connected to a lever 359 fulcrumed on a fixed pivot 361 and connected in turn to a slider 362 (FIG. 17 and 201. The slider 362 carries a pin 363 engaged in a slot 364 in a crank 366. The pin 363 normally bears against the lower end of the slot 364 and, when the crank 366 turns clockwise, is adapted to engage in a recess 367 forming the upper end of the slot. The crank 366 can pivot on a slider 368 guided in two fixed plates 369 and provided with a fork 371 which is engaged by one arm of a bellcrank lever 372 fulcrumed on a fixed pivot 373. The lever 372 is connected by means of a rod 374 (FIGS. 20 and 19) to a lever 376 fulcrumed on a fixed pivot 377 and engaged in a fork 378 of the slide 298, being thus adapted to shift this slide, and therefore the sensing devices 296 and 297, into five different positions.

When the bars 196 and 197 (FIG. 18) of the sensing device 194 are carried downward, they cooperate with rods 401 and 402, respectively, carried by a pair of rocking levers 403, only one of which is visible in the drawing, the rocking levers being disposed at the two sides of the store 151. These rocking levers can pivot on a fixed spindle 406 and carry a third rod 407 to which there is pivoted a link rod 408 connected to a lever 409. The lever 409 is fulcrumed on a fixed pivot 411 and is connected in turn to a rod 412 (FIGS. 18 and 19) connected to an elbow lever 413 fulcrumed on a fixed pivot 414. The lever 413 is provided with a slot 415 engaging a pin 416 on the slider 282 and is thus adapted to shift this slider selectively into five different positions.

The sensing bar 301 (FIG. 19) is provided with a rectangular slot 421 in which is engaged a pin 422 carried by a lever 423. The lever 423 is fulcrumed on a fixed pivot 424 and is connected via a rod 426 (FIGS. 19 and 18) to a lever 427 fulcrumed on a fixed spindle 428 and connected in turn via a rod 429 to the lever 173. Similarly, the bar 302 (FIG. 19) is provided with a rectangular slot 431 in which is engaged a pin 432 carried by a lever 433. The lever 433 is fulcrumed on a fixed pivot 434 and is connected by means of a rod 436 (FIGS. 19 and 18) to a lever 437 fulcrumed on a fixed spindle 438 and connected by means of a rod 439 to the lever 174. When the bars 301 and 302 (FIG. 19) are carried downward, they are lowered selectively by a number of steps from zero to four which are complementary to each other and the levers 173 and 174 (FIG. 18) are respectively rotated by the same number of steps and set one of the sliders 152 positively.

Figure 23:
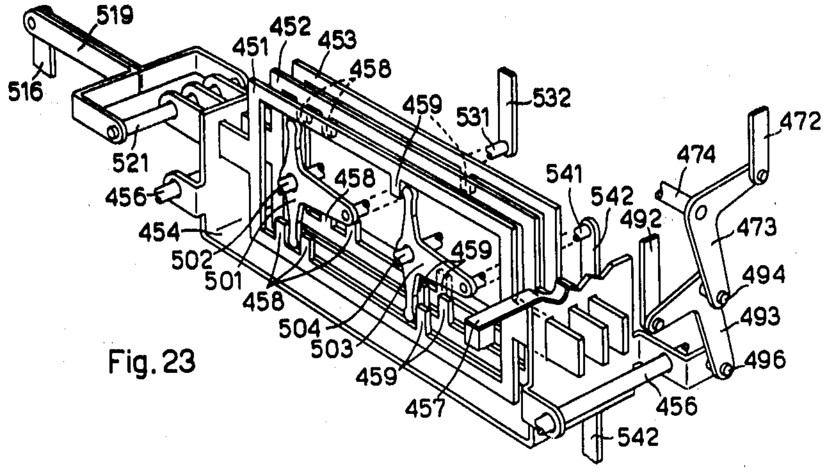
FIG. 23 is a front perspective view from the left of a detail of FIG. 20.

The calculating unit also comprises a set of three sliders 451, 452 and 453 (FIGS 20 and 23) adapted to be selected individually, according to the sum of the binary digits of an order of the two addends, by means of a pair of levers interconnected in cascade and each adapted to be rotated by the sensing device for the binary digit of the corresponding store. The slider selected is then brought into engagement with a member setting the decimal carry unit and with a member setting the storage member for the binary digit of the total store. The three sliders 451, 452 and 452 are slidable in a carriage 454 adapted to be shifted transversely on two fixed rods 456 and to be held in three different positions by a spring-positioning element 457 (FIG. 23). Each slider 451, 452 and 453 is provided with a set of coding projections 458 and a set of coding projections 459.

Figure 20:
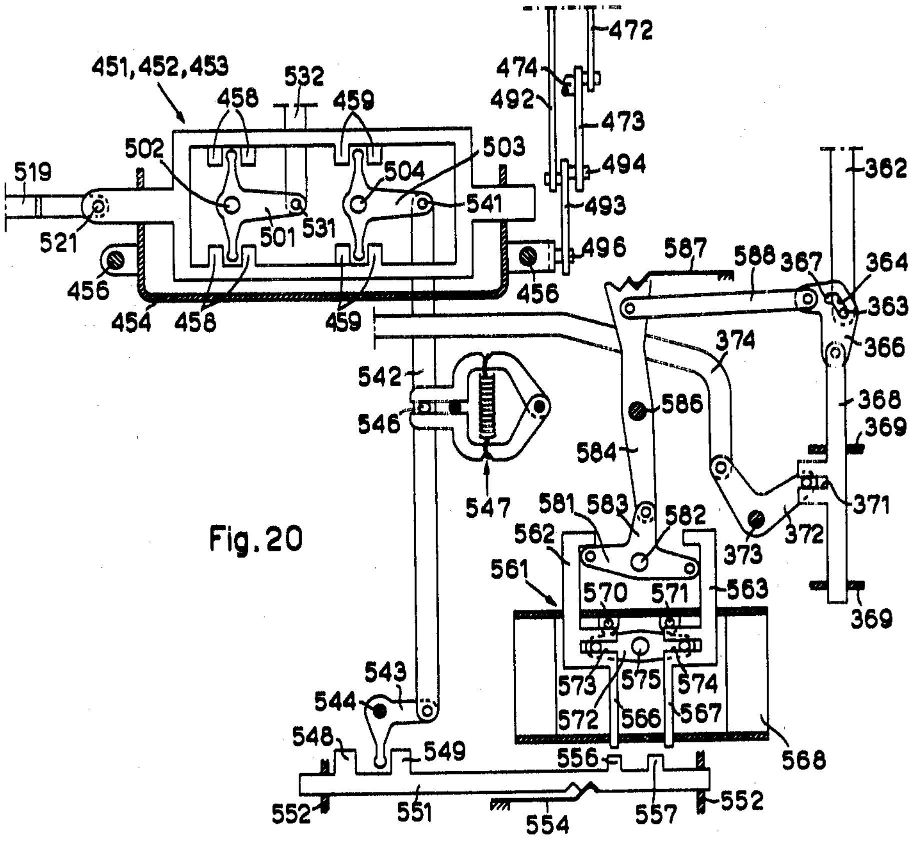
FIG. 20 is a left-hand side view of a second detail of the tabular means.

The bars 122 and 123 (FIG. 17) of the sensing device 121 cooperate during their downward movement with rods 461 and 462, respectively, carried by a pair of rocking levers 463, only one of which is visible in the drawing and which are disposed at the two sides of the store 51. These rocking levers can pivot on a fixed spindle 466 and are thus adapted to assume two different positions. They carry a third rod 467 to which these is pivoted a link bar 468 connected to a lever 469. The lever 469 is fulcrumed on a fixed pivot 471 and is connected in turn to a rod 472 (FIGS. 17, 20 and 23). The rod 472 is connected to a bellcrank lever 473 fulcrumed on a fixed pivot 474 and adapted to be held selectively in two different positions.

Figure 18:
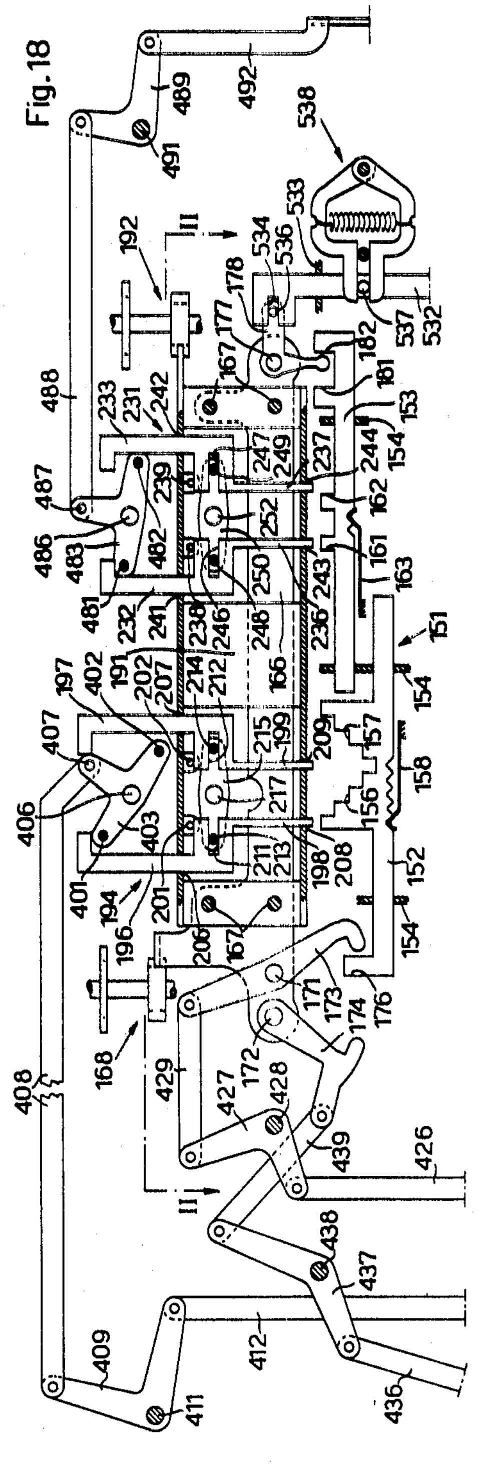
FIG. 18 is a left-hand side view of a second store of the calculating machine.

The rods 232 and 233 (FIG. 18) of the sensing device 231, when shifted downward, cooperate with rods 481 and 482, respectively carried by a pair of rocking levers 483, only one of which is visible in the drawing and which are disposed at the two sides of the store 151. These rocking levers can pivot on a fixed spindle 486 and are thus adapted to assume two different positions. They carry a third rod 487 to which these is pivoted a rod 488 connected to a lever 489. The lever 489 is fulcrumed on a fixed pivot 491 and is connected in turn to a rod 492 (FIGS. 18, 20 and 23). The rod 492 is connected to a bellcrank lever 493 fulcrumed on a pin 494 carried by the lever 473 and adapted to be held selectively in two different positions.

The two levers 473 and 493 (FIGS. 20 and 23) form a movement adding system. The lever 493 carries a pin 496 connected to the carriage 454 and adapted to bring the carriage slide selectively into one of the three different positions. The sliders 451, 452 and 453 are thus adapted to be carried selectively into correspondence with a rocking lever 501 pivoting on a fixed spindle 502 and with a rocking lever 503 pivoting on a fixed spindle 504. The rocking levers 501 and 503 are in alignment and are adapted to be engaged by the coding projections 458 and 459, respectively.

The bars 331 and 332 (FIG. 19) of the sensing device 297 are provided with a rectangular slots 511 and 512, respectively, in which there are respectively engaged pins 513 and 514 carried by a rocking lever 516. The rocking lever 516 pivots on a fixed spindle 517 and is adapted to turn selectively for a constant stroke either clockwise or anticlockwise. It carries a third pin 518 to which there is pivoted a pair of rods 519. The rod 519 (FIG. 20 and 23) bifurcate and are spanned by a spindle 521 to which the three sliders 451, 452 and 453 are pivoted. The three sliders are thus adapted to be shifted selectively forward or backward through a constant stroke. Through the medium of the projection 458, the shifting of these sliders causes the selective rotation clockwise or anticlockwise of the rocking lever 501. The rocking lever 501 carries a spindle 531 to which there is pivoted a rod 532 guided in a fixed comb 533 (FIG. 18). The rod 532 is provided with a slot 534 engaging a pin 536 fixed to the setting lever 178. The rod 532 is moreover provided with a pin or stud 537 cooperating with a spring-positioning device 538 adapted to return the lever 178 and the rocking lever 501 to the inoperative position indicated in FIGS. 18 and 20.

Through the medium of the projections 459, the shifting of the sliders 451, 452 and 453 (FIGS. 20 and 23) causes the selective rotation clockwise or anticlockwise of the rocking lever 503. The rocking lever 503 carries a spindle 541 to which there is pivoted a rod 452 connected to a setting lever 543 fulcrumed on a fixed spindle 544. The lever 543 is thus adapted to turn selectively for a constant stroke in a clockwise or anticlockwise direction. The rod 542 carries a pin 546 which cooperates with a spring-positioning device 547 adapted to return the lever 543 and the rocking lever 503 to the inoperative position indicated in FIG. 20. When the lever 543 is turned it is adapted to cooperate with two teeth 548 and 549 of a slider 551 guided in two fixed combs 552. The teeth 548 and 549 are disposed at a distance corresponding to the stroke of the lever 543 and the slider 551 can thus be shifted selectively forward or backward for the same stroke. The slider 551 is held in the two different positions by a spring-positioning element 554. The slider 551 is provided with two shoulders 556 and 557 each of which has two positions and which are similar to the shoulders 61 and 62. These shoulders are therefore adapted to store a binary carry digit and are adapted to be read by a sensing device 561 constituted by two bars 562 and 563. These bars are provided with reading projections 566 and 567, respectively, and are guided in a frame 568. The bars 562 and 563 normally bear against studs 570 and 571 carried by the frame 568 and are adapted to be carried downward by a rocking lever 572 engaging two forks 573 and 574 formed on the bars, the rocking lever pivoting on a pin 575. This pin is adapted to be carried downward cyclically in any known manner. The bars 562 and 563 cooperate selectively with a rocking lever 581 pivoting on a fixed spindle 582 and having an arm 583 connected to a lever 584 fulcrumed on a fixed spindle 586 and held in two different positions by a spring-positioning element 587.

The lever 584 is connected in turn by means of a connecting rod 588 to the crank 366. This crank is thus adapted to turn clockwise and shift the slider 368 downward via the slot 364 and the pin 363.

OPERATION

Figure 24:
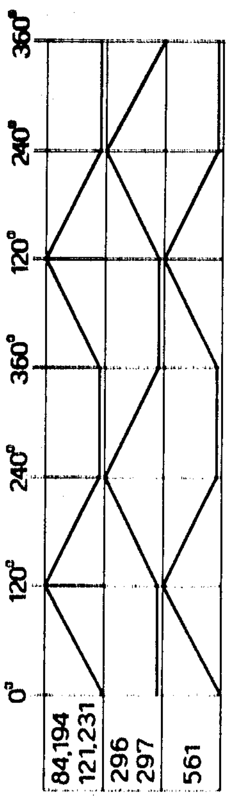
FIG. 24 is a diagram of the operating cycle of the calculating machine embodying the invention.

The operation of the machine is described with reference to the operating cycle diagram of FIG. 24, win which the numbers at the side of each line indicate the sensing devices concerned in the diagram of the corresponding line. The ascending portions of the diagram indicate that the corresponding sensing devices are in a reading phase, while the descending portions indicate that they are returning to the inoperative state and the horizontal portions that they are at rest in the inoperative position.

The numbers are set and therefore coded in accordance with the table of FIG. 1 on the setting store 51. The levers 73 and 74 (FIG. 17) are selectively rotated, clockwise and anticlockwise, respectively, by a number of steps from zero to four and which are complementary to each other and positioned the slider 52 positively in one of the five positions, introducing the quinary digit in this way into the setting store 51. In the same way, the lever 78 is selectively rotated clockwise or anticlockwise with a constant stroke and positions the slider 53 in one of the two positions, introducing the binary digit into the store 51. The sliders 52 and 53 visible in FIG. 17 are positioned to store the decimal digit zero and therefore the binary digit and the quinary digit zero. The levers 73, 74 and 78 are now returned to the inoperative position of FIG. 17. Under the control of the advancing device 68, the carriage 66 then advances by one step, bringing the setting levers 73, 74 and 78 into correspondence with the second pair of sliders 52 and 53 and the sensing devices 84 and 121 into correspondence with the pair of sliders 52 and 53 already set. At the end of the setting operation, the sensing devices 84 and 121 are disposed in correspondence with the last pair of sliders 52 and 53 that have been set, which store the digit of the units order.

At the beginning of the calculation operation, in which the number in the store 51 is added into the total store 151 the spindle 107 (FIG. 17) is carried downward for constant stroke and, by means of the rocking levers 105 and 106 and the rods 103 and 104, carries the bars 86 and 87 of the sensing device 84 downward. The projections 88 and 89 of the bars 86 and 87 bear respectively against a step of the projection 56 and a step of the projection 57, so that the bars 86 and 87 perform two complementary strokes. These bars come into engagement with the rods 351 and 352, respectively, thereby causing the pair of rocking levers 353 to rotate selectively for a certain stroke. The lever 359 is rotated through the rod 358 and, via the rod 362 (FIG. 20), causes the crank 366 to be shifted selectively upward or downward, the crank being normally prevented from rotating by the connecting rod 588, as a result of which the movement is transmitted rigidly to the slider 368. The slider 368 rotates the lever 372 and, therefore, through the rod 374 (FIG. 19), the lever 376, which selectively positions in one of the five different positions the slide 298 and, therefore, the sensing devices 296 and 297, thus introducing into the calculating unit the quinary digit stored in the setting store.

At the same time, the sensing device 194 (FIG. 18) is caused to read the projections 156 and 157 of the slider 152. Through the rods 401 and 402, the bars 196 and 197 rotate the rocking levers 403 selectively by a number of steps from zero to four. Through the rod 408, these rocking levers rotate the lever 409 and, therefore, through the rod 412, rotate the lever 413, (FIG. 19) which selectively positions the slider 282 in one of the five possible positions, thus introducing into the calculating unit the quinary digit stored in the total store.

Still at the same time, the sensing device 121 (FIG. 17) adapted to read the binary digit stored in the projections 61 and 62 of the subjacent slider 53 is also carried downward. Through the rods 461 and 462, the bars 122 and 123 rotate the rocking levers 463 which, through the rod 468, the lever 469 and the rod 472, selectively positions the lever 473 (FIG. 23). More particularly, if the binary digit is zero, the lever 473 remains in the position of FIG. 23, and if it is one the lever rotates clockwise by one step.

At the same time, the sensing device 231 (FIG. 18) adapted to read the binary digit stored in the projections 161 and 162 of the subjacent slider 153 is also carried downward. Through the rods 481 and 482, the bars 232 and 233 rotate the rocking levers 483 which, through the rod 488, the lever 489 and the rod 492, selectively position the lever 493 (FIG. 23). The pin 496 can assume three different positions respectively corresponding to the situations or positions of the binary digits 00, 01 and 10, 11. The shifting of the pin 496 brings the carriage 454 into one of three different positions and therefore selectively positions one of the three sliders 451, 452, 453 in correspondence with the two rocking levers 501 and 503. More particularly, the slider 451 is brought into correspondence with the rocking levers 501 and 503 if the situation of the binary digit of the addends is 00, the slider 452 is brought into correspondence with the rocking levers 501 and 503 if the cases 01 and 10 obtain and, finally, the slider 453 is brought into correspondence with the rocking levers 501 and 503 if the case 11 obtains.

Simultaneously with the reading phase of the sensing devices 84, 194, 121 and 231 there occurs the advancement by one step of the carriage 166 (FIGS. 18 and 22) by means of the advancing device 168. The setting levers 173, 174 and 178 are brought into correspondence with the first pair of sliders 152 and 153, the same pair of sliders which the sensing devices 194 and 231 are reading.

The sensing devices 84, 194, 121 and 231 now begin their return to the inoperative position. The respective bars bear against the corresponding studs defining the inoperative position. At this point, the two sensing devices 296 and 297 of the calculating unit (FIG. 19) are brought downward and respectively read the two stepped profiles 286 and 288 and the two shoulders 291 and 292. The two sensing devices 296 and 297 are adapted to deliver respectively the true quinary digit of the sum number and the binary digit relative to the cases 00 and 11 of the addends, corresponding to the cases 01 and 10 of the carries. The bars 301 and 302 of the sensing device 296 rotate the setting levers 173 and 174 through the lever 423, the rod 426, the lever 427 (FIG. 18) and the rod 429 and, respectively, the lever 433 (FIG. 19), the rod 436, the lever 437 (FIG. 18) and the rod 439, for two complementary strokes, thus positioning the corresponding slider 152 in such manner as to store the quinary digit of the sum number. The bars 331 and 332 (FIG. 19) of the sensing device 197 rotate the rocking lever 516 anticlockwise by one step if the binary digit read is zero and clockwise by one step if the binary digit read is one. This rotation causes the shifting backwards or forwards, respectively, of the sliders 451, 452 and 453 (FIGS. 20 and 23). If the situation of the binary digit and the addends is 00 or 11, the binary digit to be entered in the total store is the same as read in the calculating unit. The reading of a zero must therefore cause the rocking lever 501 to rotate clockwise and the reading of a one must cause it to rotate anticlockwise. On the sliders 451 and 453 there will therefore be two projections 458 disposed in the lower part of the frame. If the situation of the binary digit of the addends is 01 or 10, the binary digit to be carried in the total store is complementary to that read in the calculating unit. The reading of a zero must therefore cause the rocking lever 501 to rotate anticlockwise and the reading of a one must cause it to rotate clockwise. On the slider 452 there are therefore two projections 458 disposed on the upper part of the frame. The clockwise rotation of the rocking lever 501 causes, through the rod 532, the clockwise rotation of the lever 178 (FIG. 18) and, therefore, the rearward positioning of the slider 163 such manner as to store zero. The anticlockwise rotation of the rocking lever 501, on the other hand, causes the anticlockwise rotation of the lever 178 and the forward positioning of the slider 153 in such manner as to store one.

If the situation of the binary digit in the addends is 00, a carry is never present. In whatever manner the slider 451 (FIGS. 20 and 23) is shifted, the rocking lever 503 must turn clockwise. The slider 451 will therefore be provided with two projections 459, one disposed at the top and to the rear and one disposed at the bottom and at the front on the frame. If the situation of the binary digit of the addends is 01 or 10, the signal to be carried is identical to that of the case 00 and 11 for the binary digit, for which reason the slider 452 will be provided with two projections 459 disposed at the bottom on the frame. Finally, if the situation of the binary digit of the addends is 11, a carry is always present, for which reason whatever the manner in which the slider 453 is shifted the rocking lever 503 must rotate anticlockwise. The slider 453 will therefore be provided with two projections 459, one disposed at the top and in front and one disposed at the bottom and to the rear on the frame. The clockwise rotation of the rocking lever 503 causes, through the rod 542, the clockwise rotation of the lever 543 and, therefore, the rearward positioning of the slider 551 adapted to store the zero through the shoulders 556 and 557. The anticlockwise rotation of the rocking lever 503, on the other hand, causes the anticlockwise rotation of the lever 543 and, therefore, the forward positioning of the slider 551 in such manner as to store the digit one by means of the shoulders 556 and 557. It should be noted that the return of the sensing devices 194 and 231 takes place simultaneously with the setting of the result of the calculation in the sliders 152 and 153 relative to the same order. The initial gap between the reading projections 303, 304 and 333, 334 (FIG. 19) of the sensing devices 296 and 297 and the corresponding stepped profiles 286, 288 and 291, 292 is such, however, as to permit the raising of the reading projections of the sensing devices 194 and 231 for a stroke corresponding to at least one step before the corresponding sliders 152 and 153 (FIG. 18) begin the longitudinal movement, so that there is never any interference between these projections and the corresponding steps or shoulders.

The sensing devices 296 and 297 (FIG. 19) now begin the rising movement and return to their inoperative position, also returning to the inoperative position the setting levers 173 and 174 (FIG. 18) and the sliders 451, 452 and 453 (FIGS. 20 and 23), thereby permitting the spring-positioning device 538 (FIG. 18) to return the setting lever 178 to the inoperative position and the spring-positioning device 547 (FIG. 20) to return the lever 543 to the inoperative position.

At this point, the sensing devices 84 and 121 (FIGS. 17 and 21) are returned to the inoperative position and the advancing device 68 allows the carriage 66 to return by one step. The carriage 66 thus brings the sensing devices into correspondence with the following pair of sliders 52 and 53, which store the digit of the order immediately higher than the preceding one. In the same way, the sensing devices 194 and 231 (FIGS. 18 and 22) are returned to the inoperative position and the advancing device 168 advances the carriage 116 by one step, the carriage thus bringing its sensing devices into correspondence with the pair of sliders 152 and 153 which store the digit of the order higher than the preceding one.

The second cycle now begins. Simultaneously with the reading of the digits of the new order by the sensing devices 84, 121 (FIG. 17), 194, 231 (FIG. 18) there takes place the reading of the shoulders 556 and 557 (FIG. 20) of the slider 551 by the sensing device 561 for the introduction of the carry into the calculating unit. The bars 562 and 563 act selectively on the rocking lever 581, imparting thereto a clockwise rotation if the digit read is zero, that is if a carry is absent. The lever 584 holds the connecting rod 588 drawn to the rear so as to hold the crank 366 turned anticlockwise and therefore hold the pin 363 of the rod 362 so that it bears against the bottom edge of the slot 364. If a carry is present, the rocking lever 581 is rotated anticlockwise and causes the lever 584 to rotate clockwise and, by means of the connecting rod 588, the lever 584 causes the crank 366 to rotate clockwise. The slot 364 is guided by the pin 363 until the latter engages in the recess 367 of the slot. The slider 368 is thus urged downward by one step and, through the lever 372, the rod 374 and the lever 376 (FIG. 29) shifts the slide 298 and, therefore, the sensing devices 296 and 297 to the rear to one step, thus introducing one more unit into the calculation of the digit of the order immediately higher than that which has given rise to the carry.

When the carriage 66 has returned to the rest position, ready for setting in a further addend, and any final carries have been effected by the total store and the calculating unit, the total store carriage is automatically returned to the rest position, ready for performance of the next adding operation.

I claim:

1. A machine for calculating decimal numbers coded in accordance with a biquinary code and comprising:

a setting store and a total store, each store having a plurality of orders, each order comprising a two-position first member and a five-position second member;

a tabular member having a stepped profile representing a quinary digit of a numerical order and a pair of shoulders representing a binary digit of said order, said tabular members operable to assume in a first direction a position variable according to the value of the quinary digit set in an order of one of said stores;

a sensing arrangement comprising a profile sensing device and a separate shoulder sensing device; and a common support for the sensing devices operable to assume in a second direction a position variable according to the value of the quinary digit set in the corresponding order of the other of said stores, thereby to sense on said stepped profile and said shoulders the sum of the numerical orders.

2. Machine as set forth in claim 1 wherein said tabular member has a second stepped profile symmetrical with respect to said first-mentioned stepped profile and a second pair of shoulders symmetrical with respect to said first-mentioned pair of shoulders, each of said sensing devices comprising two feeler elements operable to be moved positively for complementary strokes.

3. A machine as set forth in claim 1 wherein said tabular member and said support are moveable along adjacent parallel paths.

4. A machine as set forth in claim 2 wherein said tabular member and said support are moveable along adjacent parallel paths.

5. A machine as set forth in claim 1 wherein is included a set of three sliders and a pair of levers operable to select an individual slider according to the sum of the binary digits set in the corresponding orders of the stores, said levers being connected in cascade relationship, each lever being operably connected to a respective one of said stores for actuation thereby in accordance with the position of the two-position member of the corresponding order of the store.

6. A machine as set forth in claim 2 wherein is included a set of three sliders and a pair of levers operable to select an individual slider according to the sum of the binary digits set in tee corresponding orders of the stores, said levers being connected in cascade relationship, each lever being operably connected to a respective one of said stores for actuation thereby in accordance with the position of the two-position member of the corresponding order of the store.

7. A machine as set forth in claim 3 wherein is included a set of three sliders and a pair of levers operable to select an individual slider according to the sum of the binary digits set in the corresponding orders of the stores, said levers connected in cascade relationship, each lever being operably connected to a respective one of said stores for actuation thereby in accordance with the position of the two-position member of the corresponding order of the store.

8. A machine as set forth in claim 4 wherein is included a set of three sliders and a pair of levers operable to select an individual slider according to the sum of the binary digits set in the corresponding orders of the stores, said levers being connected to cascade relationship, each lever being operably connected to a respective one of said stores for actuation thereby in accordance with the position of the two-position member of the corresponding order of the store.

9. A machine as set forth in claim 5 wherein is included a settable decimal carry member, at least one of the sliders being engageable with the carry member for setting the same, said one slider being connected to said shoulder sensing device.

10. A machine as set forth in claim 6 wherein is included a settable decimal carry member, at least one of the sliders being engageable with the carry member for setting the same, said one slider being connected to said shoulder sensing device.

11. A machine as set forth in claim 7 wherein is included a settable decimal carry member, at least one of the sliders being engageable with the carry member for setting the same, said one slider being connected to said shoulder sensing device.

12. A machine as set forth in claim 8 wherein is included a settable decimal carry member, at least one of the sliders being engageable with the carry member for setting the same, said one slider being connected to said shoulder sensing device.

13. A machine as set forth in claim 1 wherein is included a second and a third sensing arrangement for reading said setting store and said total store respectively order by order, and said tabular member and said support being set under the control of said second and third arrangements.

14. A machine as set forth in claim 2 wherein is included a second and a third sensing arrangement for reading said setting store and said total store respectively order by order, said tabular member and said support being set under the control of said second and third arrangements.

15. A machine as set forth in claim 3 wherein is included a second and a third sensing arrangement for reading said setting store and said total store respectively order by order, said tabular member and said support being set under the control of said second and third arrangements.

16. A machine as set forth in claim 4 wherein is included a second and a third sensing arrangement for reading said setting store and said total store respectively order by order, said tabular member and said support being set under the control of said second and third arrangements.

17. A machine as set forth in claim 5 wherein is included a second and third sensing arrangement for reading said setting store and said total store respectively order by order, said tabular member and said support being set under the control of said second and third arrangements.

18. A machine as set forth in claim 6 wherein is included a second and a third sensing arrangement for reading said setting store and said total store respectively order by order, said tabular member and said support being set under the control of said second and third arrangements.

19. A machine as set forth in claim 7 wherein is included a second and a third sensing arrangement for reading said setting store and said total store respectively order by order, said tabular member and said support being set under the control of said second and third arrangements.

20. A machine as set forth in claim 8 wherein is included a second and a third sensing arrangement for reading said setting store and said total store respectively order by order, said tabular member and said support being set under the control of said second and third arrangements.

21. A machine as set forth in claim 9 wherein is included a second and a third sensing arrangement for reading said setting store and said total store respectively order by order, said tabular member and said support being set under the control of said second and third arrangements and said carry member.

22. A machine as set forth in claim 10 wherein is included a second and a third sensing arrangement for reading said setting store and said total store respectively order by order, said tabular member and said support being set under the control of said second and third arrangements and said carry member.

23. A machine as set forth in claim 11 wherein is included a second and a third sensing arrangement for reading said setting store and said total store respectively order by order, said tabular member and said support being set under the control of said second and third arrangements and said carry member.

24. A machine as set forth in claim 12 wherein is included a second and a third sensing arrangement for reading said setting store and said total store respectively order by order, said tabular member and said support being set under the control of said second and third arrangements and said carry member.

25. A machine as set forth in claim 24 wherein is included a first setting member operably associated with the first members of the total store for setting the same and a pair of second setting members having complementary movements and operably associated with the second members of the total store for setting the same, said pair of second members being directly coupled to said profile sensing device for operation thereby, said first setting member being operably associated with said sliders for operation thereby.

26. A method of calculating decimal numbers in which each decimal order of two operands is stored in accordance with a biquinary code, said method comprising the steps of:

placing a first member in a setting store by setting the binary digit of each order of the first number in a first code member adapted to be set in two different positions and setting the quinary digit of each order of the first number in a corresponding second code member adapted to be set in five different positions;

placing a second number in a total store by setting the binary digit of each order of the second number in a third code member adapted to be set in two different positions and setting the quinary digit of each order of the second number in a corresponding fourth code member adapted reading the stores simultaneously order by order and delivering the total of each order to a tabulating device;

reading the tabulating device and transferring the result of each order back into the total store while temporarily storing any carry unit present for adding into the total of the next order on the tabulating device.

27. A method of calculation as set forth in claim 26 wherein is included the steps of:

including in said tabular means, a first table representing all the possible results of the quinary digits of an operands;

reading the table as a function of the quinary digit of an order of each of the two operands;

providing another table adapted to be read as a function of the binary digit of the same order of operands; and conditioning the value of the binary digit of the result and the carry for the following decimal order.

28. A method of calculation as set forth in claim 27 wherein is included the steps of:

representing in said tabular means, the sums of a decimal order of two addends;

temporarily storing the carry unit for the following order; and influencing the reading of said first table by the storing of the carry unit of the immediately lower order.

29. A method of calculation set forth in claim 28 wherein is included the step of representing in said tables, each sum of the digit of an order of said addends irrespective of the addends which generate the sum, whereby the number of said sums is considerably reduced.

30. A method of calculation as set forth in claim 29 wherein is included the steps of:

providing in said first table, a first group of elements which may be read to supply the value of the quinary digit of the result and a second group of elements which may be read in association with the reading of said other table to supply the value of the binary digit of the result and the value of the carry unit for the following order;

representing in said first table, in addition to the sums of the quinary digits of the two operands, the sum thereof with the decimal carry unit of the immediately lower order; and reading the elements to obtain a result.

31. A machine for calculating decimal numbers in which each decimal order to two operands is stored in accordance with a biquinary code, said machine comprising:

a plurality of first code members adapted to be set in one of two positions for storing the binary digits of said code;

a plurality of second code members adapted to be set in one of five different positions in combination with said first member for storing the quinary digits of said code, each first code member having a corresponding second code member associated therewith, said members being arranged in a total store adapted to receive in succession the result of the operations;

a tabular calculating means;

means for reading said stores order by order and delivering the numbers of a decimal order of the two stores at the same time to said tabular calculating means; and means for delivering the result of the operation, order by order, to the total store and for temporarily storing the carry unit for the following decimal order.

32. A machine as set forth in claim 31 wherein said tabular means comprises a first table containing all the possible results of the quinary digits of an order to two operands and is adapted to be read as a function of the quinary digit of an order of each of the two operands, and a second table adapted to be read as a function of the binary digit of the same order of the operands being provided for conditioning the value of the binary digit of the result and the carry for the following decimal order.

33. A machine as set forth in claim 32 wherein said tabular means is designed to represent the sums of a decimal order of the carry unit for the following order and for influencing the reading of said first table by the storing of the carry unit of the immediately lower order.

34. A machine as set forth in claim 33 wherein said tables are designed to represent each sum of the digit of an order of said addends irrespective of the addends which generate the sum, whereby the number of said sums is considerably reduced.

35. A machine as set forth in claim 34 wherein said first table comprises a first group of elements readable to supply the value of the quinary digit of the result and a second group of elements readable in association with the reading of said second table to supply the value of the binary digit of the result and the value of the carry unit for the following order, said first table being designed to represent, in addition to the sums of the quinary digits of the two operands, the sum thereof with the decimal carry unit of the immediately lower order.